(12) United States Patent
Nickel et al.

(10) Patent No.: US 10,267,529 B2
(45) Date of Patent: Apr. 23, 2019

(54) SYSTEM AND METHOD FOR DYNAMICALLY CONTROLLING ECONOMIZERS

(71) Applicant: Quest Controls, Inc., Palmetto, FL (US)

(72) Inventors: Kenneth Earl Nickel, Placerville, CA (US); Scott Hicks, Palmetto, FL (US); Edward F. Goggin, Palmetto, FL (US); David Charles Moore, Campbell, CA (US)

(73) Assignee: Quest Controls, Inc., Palmetto, FL (US)

( * ) Notice: Subject to any disclaimer, the term of this patent is extended or adjusted under 35 U.S.C. 154(b) by 313 days.

(21) Appl. No.: 15/148,529

(22) Filed: May 6, 2016

(65) Prior Publication Data
US 2017/0321917 A1 Nov. 9, 2017

(51) Int. Cl.
*F24F 11/00* (2018.01)
*G05B 15/02* (2006.01)
(Continued)

(52) U.S. Cl.
CPC ......... *F24F 11/0001* (2013.01); *F24F 3/044* (2013.01); *F24F 11/30* (2018.01);
(Continued)

(58) Field of Classification Search
CPC .. F24F 11/0001; F24F 11/0012; F24F 11/006; F24F 11/053; F24F 11/30; F24F 11/46; F24F 11/62; F24F 11/76; F24F 2011/0002; F24F 2011/0013; F24F 2011/0016; F24F 2011/0075; F24F 2110/10

See application file for complete search history.

(56) References Cited

U.S. PATENT DOCUMENTS

| 5,276,630 | A | 1/1994 | Baldwin et al. |
| 5,447,037 | A | 9/1995 | Bishop et al. |

(Continued)

OTHER PUBLICATIONS

"CoolMizer Brochure" by "Arzel Zoning Technology, Inc." (Year: 2014).*

(Continued)

*Primary Examiner* — Yuhui R Pan
(74) *Attorney, Agent, or Firm* — Brinks Gilson & Lione; Stephen J. Leahu

(57) ABSTRACT

A system and method for a controller of economizers operatively connected to HVAC equipment. The controller is adapted to maintain the temperature within a facility based on inside air setpoints and outside air setpoints. The controller receives inside air temperature readings and compares them to inside air setpoints in order to determine the cooling demand for the facility. The controller also receives outside air temperature readings and compares them to outside air setpoints in order to determine which economizers may be activated. The outside air setpoints may be dynamically adjusted to adapt and meet the cooling demand of the facility. The controller compares the outside air setpoints to predetermined maximum and minimum setpoints in order to determine whether to adjust the outside air setpoints.

12 Claims, 10 Drawing Sheets

(51) Int. Cl.
*F24F 11/62* (2018.01)
*F24F 11/76* (2018.01)
*F24F 11/30* (2018.01)
*F24F 3/044* (2006.01)
*F24F 110/22* (2018.01)
*F24F 11/46* (2018.01)
*F24F 110/10* (2018.01)
*F24F 110/12* (2018.01)

(52) U.S. Cl.
CPC .............. *F24F 11/62* (2018.01); *F24F 11/76* (2018.01); *G05B 15/02* (2013.01); *F24F 11/46* (2018.01); *F24F 2011/0002* (2013.01); *F24F 2110/10* (2018.01); *F24F 2110/12* (2018.01); *F24F 2110/22* (2018.01); *G05B 2219/2642* (2013.01); *Y02B 30/767* (2013.01)

(56) References Cited

U.S. PATENT DOCUMENTS

| | | |
|---|---|---|
| 6,634,422 B2 | 10/2003 | Rayburn et al. |
| 7,797,080 B2 | 9/2010 | Durham, III |
| 8,694,166 B2 | 4/2014 | Quirk |
| 8,719,720 B2 | 5/2014 | Grabinger et al. |
| 8,744,632 B2 | 6/2014 | Blackshaw et al. |
| 9,097,432 B2 | 8/2015 | Kreft et al. |
| 2001/0010266 A1* | 8/2001 | Rayburn .................. F24F 3/044 165/257 |
| 2003/0181158 A1* | 9/2003 | Schell .................... F24F 3/0442 454/229 |
| 2007/0084938 A1* | 4/2007 | Liu ........................ B64D 13/06 236/91 D |
| 2012/0165992 A1* | 6/2012 | Fildes ..................... F23N 1/082 700/277 |
| 2012/0167600 A1* | 7/2012 | Dunnavant ........... F24F 12/006 62/89 |
| 2012/0310420 A1* | 12/2012 | Quirk ................. G05D 23/1934 700/278 |
| 2013/0178987 A1 | 7/2013 | Meirav et al. |
| 2013/0324027 A1 | 12/2013 | Davis |
| 2014/0202449 A1* | 7/2014 | Snyder .................. F24F 5/0035 126/714 |
| 2014/0207288 A1 | 7/2014 | Albrecht et al. |
| 2014/0277759 A1 | 9/2014 | Sipe et al. |

OTHER PUBLICATIONS

"Dynamic simulation of energy management control functions for HVAC systems in buildings," Energy Conversion and Management 47 (2006) 926-943, available online Aug. 8, 2005.

* cited by examiner

| Control Decision Matrix | Inside Temperature Reading | | | | |
|---|---|---|---|---|---|
| | Below Cooling Off Setpoint (C0) | Above Cooling Setpoint 1 (CS1) | Above Cooling Setpoint 2 (CS2) | Above Cooling Setpoint 3 (CS3) | Above Cooling Setpoint 4 (CS4) |
| Below Level 1 (L1) | All Econonmizers and AC compressors off | Lead Economizer group turned on | Lead and Lag economizer groups turned on | Economizers turned off and Lead AC compressor turned on Adjust L1 & L2 | Economizers off, Lead and Lag AC compressors turned on. |
| Between Level 1 (L1) and Level 2 (L2) | All Econonmizers and AC compressors off Adjust L1 & L2 | Lead and Lag economizer groups turned on | Economizers turned off and Lead AC compressor turned on Adjust L1 & L2 | Economizers off, Lead and Lag AC compressors turned on. | |
| Above Level 2 (L2) | All Econonmizers and AC compressors off | Economizers turned off and Lead AC compressor turned on | Economizers off, Lead and Lag AC compressors turned on. | | |

Outside Air Temperature Reading

Figure 9

SYSTEM AND METHOD FOR DYNAMICALLY CONTROLLING ECONOMIZERS

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The presently disclosed invention relates in general to heating, ventilation, and air conditioning (HVAC) systems, and in particular to systems and methods for dynamically controlling economizers adapted to utilize outside air for HVAC systems.

BACKGROUND

Basic HVAC systems equipped with economizers are known in the art. Technology for such equipment and components has been described in the following U.S. patents and publications: U.S. Pat. Nos. 6,634,422; 9,097,432; No. 2014/0277759; U.S. Pat. Nos. 8,744,632; and 8,694,166. These patents and publications are incorporated herein by reference.

One drawback with certain implementations of economizers includes calculations based upon electrical or current load information concerning telecommunication equipment located in a facility. Due to the excess heat generated by telecommunication devices, certain equipment may be temporarily or permanently relocated outside of a facility. Load measurements that do not account for the location of such equipment provide unreliable information for purposes of controlling economizers. Modifications of power plant systems to monitor energy consuming equipment in or around a facility may not be feasible or practical. Certain systems that store control settings for an air conditioning unit that includes an economizer for a facility may not be readily altered due to their dependence on electric current readings. Rather than modifying such systems or their underlining devices for reading electrical or current load information, embodiments of the presently disclosed invention, inter alia, addresses the problem of dynamically maintaining the temperature within a facility by controlling an economizer without electrical or current load information for the equipment located in the facility.

SUMMARY OF THE INVENTION

Embodiments of the presently disclosed invention may enable HVAC equipment equipped with air side economizers to control the temperature within a facility. In certain embodiments, the economizers may be operably connected to the HVAC equipment. Accordingly, in some embodiments, the economizers may be standalone units. Certain implementations may dynamically adjust outside air setpoints to adapt and meet the cooling demand of the facility.

In an embodiment of the disclosed system, method or computer-readable medium for controlling HVAC equipment, the implementation may comprise a determination, by an economizer controller, of whether certain economizers may be activated or deactivated based on an outside air temperature comparison and an inside air temperature comparison. In the former comparison, an outside air temperature reading may be compared with an outside air setpoint. In the latter comparison, an inside air temperature reading may be compared with an inside air setpoint. The implementation may also comprise a determination, by the economizer controller, of whether a cooling unit may be activated or deactivated based on the outside air temperature comparison and the inside air temperature comparison. In certain embodiments, the implementation may further comprise a determination, by the economizer controller, of whether additional economizers may be activated or deactivated based on the outside air temperature comparison and the inside air temperature comparison. In some embodiments, the implementation may comprise a determination, by the economizer controller, of whether the outside air setpoints may be adjusted based on the outside air temperature comparison and the inside air temperature comparison. In certain embodiments, any of these determinations may further comprise a comparison of an outside air humidity reading with an outside air humidity setpoint for a facility in order to account for the amount of enthalpy in the outside air.

BRIEF DESCRIPTIONS OF THE DRAWINGS

The foregoing and other objects, features, and advantages of the invention will be apparent from the following more particular description of embodiments as illustrated in the accompanying drawings, in which reference characters refer to the same parts throughout the various views. The drawings are not necessarily to scale, emphasis instead being placed upon illustrating principles of the invention.

FIG. 9 is a decision matrix illustrating determinations that account for various fluctuations in inside air temperature readings and outside air temperature readings, in accordance with certain embodiments of the invention.

DETAILED DESCRIPTION

Reference will now be made in detail to the embodiments of the presently disclosed invention, examples of which are illustrated in the accompanying drawings.

Conventional air-side economizers are used in conjunction with HVAC units to save energy by using outside air as a means of cooling the indoor air in buildings. When the outside air is determined to be sufficiently cool and sufficiently dry, additional conditioning of the outside air is not needed. Utilization of the outside air may be more energy efficient than conditioning air recirculated within buildings when the temperature of the outside air is less than the temperature of the indoor air. Existing air-side economizer control schemes based on electrical or current load information concerning telecommunication equipment located in and/or adjacent to a facility may not be reliable. An advantage of the presently disclosed invention may include the dynamic adjustment of outside air setpoints to adapt and meet the cooling demand of a facility.

Figure 1:
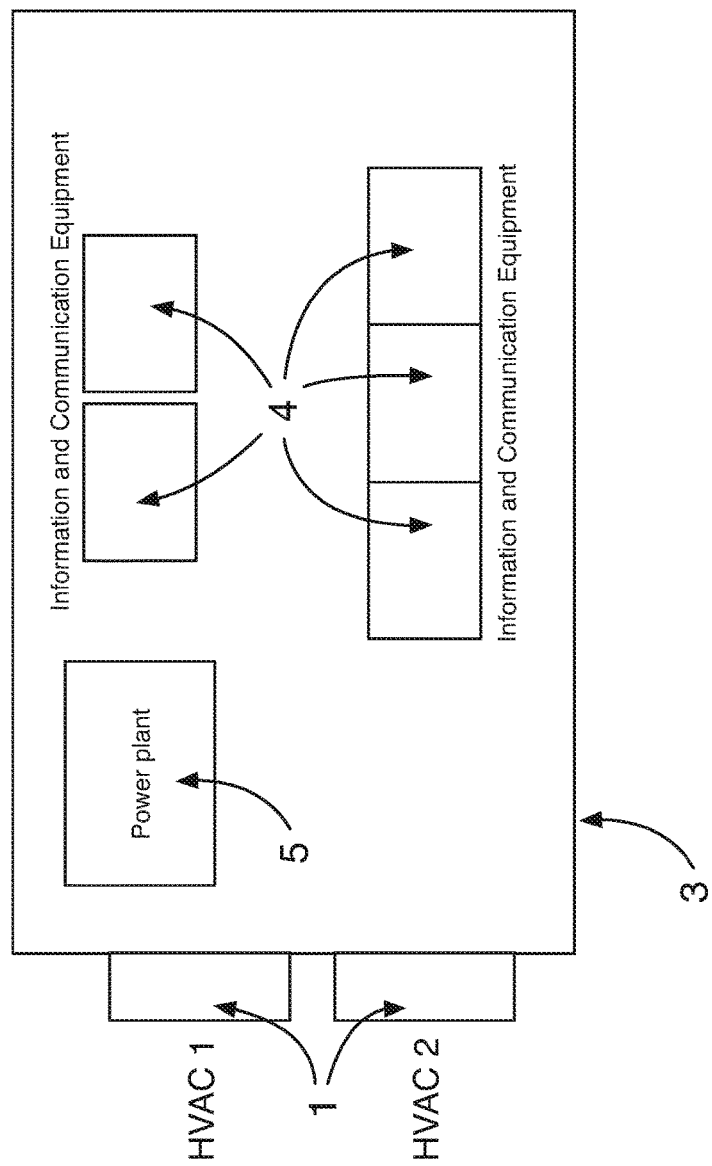
FIG. 1 is a diagram illustrating a telecommunication facility, in accordance with certain embodiments of the invention.

The presently disclosed invention may be embodied in various forms, including a device, a system, a method or a computer readable medium for dynamically maintaining the temperature within a facility by controlling an economizer. In an embodiment, a method may include the step of controlling HVAC equipment 1 equipped with airside economizers 2 for facilities 3. In some embodiments, an economizer 2 may be a standalone unit that is adapted to operate with HVAC equipment 1. The facility 3 may include a building, which may be used for residential, commercial or industrial purposes. As illustrated in FIG. 1, a facility 3 may be a telecommunications facility 3. Such facilities 3 may be unmanned and house information/communications equipment 4 that may require constant cooling for proper operation. Information/communications equipment 4 may include computation device, network devices, servers, and storage devices. A facility 3 may also house a power plant or source 5 adapted to supply power to the information/communications equipment 4. A power source 5 may include an uninterruptible power supply, a battery, a converter and/or an inverter. An economizer 2 may comprise HVAC components, such as blowers/fans and dampers, to draw in outside air (OSA) 6. The heat produced by the power plant 5 and the information/communications equipment 4 may increase the cooling demand of a telecommunications facility 3. In certain embodiments, these facilities 3 may employ multiple wall mounted HVAC equipment 1 in a lead/lag scenario, where a lead group 7 of economizers 2 is utilized to handle the temperature or heat load 8 of the facility 3 and a backup or lag group 9 of economizers 2 is used for extreme temperature conditions and/or redundancy.

In certain embodiments, economizers 2 may be used to provide outside air 6 to cool the facility 3 may be based on two determinations. While the first determination may relate to whether a need for cooling the facility 3 exists, and may depend on an inside air (ISA) temperature reading 10; the second determination may focus on whether economizers 2 may be used and, if so, how many economizers 2 are needed, and may depend on an outside air setpoint 11 and an outside air temperature reading 12. Although the temperature measurements and comparisons for each of the two determinations may be independently made, the outcome of the two determinations may be used in an interrelated manner to determine whether the temperature of the outside air 6 is sufficient to maintain the targeted temperature setpoint 13 for the facility 3. For the first determination, the inside air temperature reading 10 may be compared to one or more cooling, or inside air, setpoints 14. In certain embodiments, an inside air setpoint 14 may be the targeted temperature setpoint 13 for the facility 3. When the inside temperature reading 10 rises above a first inside air setpoint 14, the second determination may be made to determine the number of economizers 2 to be utilized based on an outside air temperature reading 12. If the outside air temperature reading 12 is below a first outside air setpoint 11, then a predetermined number of economizers 2 may be utilized. A determination to activate additional economizers 2 may be made if either the outside temperature reading 12 rises to between the first outside air setpoint 11 and a second outside air setpoint 11, or the inside temperature reading 10 rises between a second inside air setpoint 14 and a third inside air setpoint 14. If either the outside temperature reading 12 rises above the second outside air setpoint 11, or the inside temperature reading 10 rises above the third inside air setpoint 14, then a determination may be made to deactivate all of the economizers 2 and to activate cooling units for the conditioning of the air circulated within the facility 3. In some embodiments, an economizer 2 may remain in an active state so long as the outside air temperature 12 is less than the inside air temperature 10. In an embodiment, an economizer 2 may remain active only when the outside air 6 is determined to be sufficiently cool so that additional conditioning of the outside air 6 is not needed to maintain the targeted temperature 13 for the facility 3. Optionally, in accordance with some embodiments, the outside air 6 may need to be sufficiently dry that the amount of enthalpy 15 in the outside air 6 may be acceptable.

Figure 2:
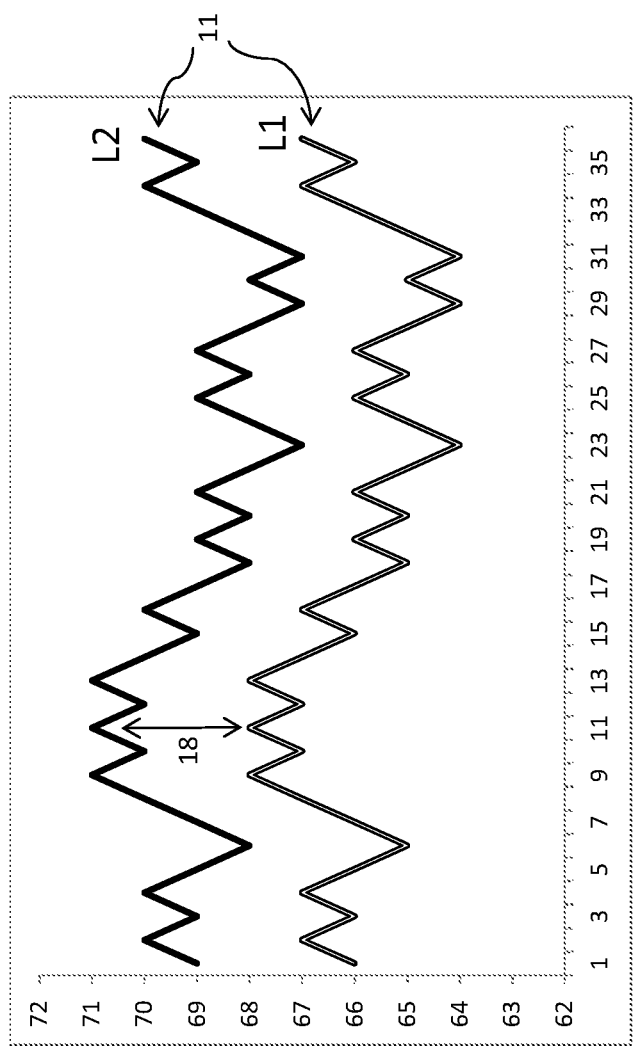
FIG. 2 is a chart illustrating outside air setpoints adjusted over time, in accordance with certain embodiments of the invention.

In certain embodiments, using economizers 2 reduces the energy consumption 16 of HVAC equipment 1 by maintaining the targeted temperature 13 in order to satisfy the cooling requirements of a facility 3 without having to activate the air conditioning compressor(s) 17. In addition, the utilization of economizers 2 may extend the effective operating life of air conditioning compressors by reducing their running time. Further, in some embodiments, benefits may include a reduction in manpower for configuring and adjusting the economizer controls. In accordance with certain embodiments, the presently disclosed invention may enable a targeted temperature 13 for a facility 3 to be maintained by adjusting or "floating" an outside air setpoint 11 in order to dynamically adapt to the cooling requirements of the facility 3. As depicted by the chart shown in FIG. 2, a first outside air setpoint 11, labeled "level one" or "L1" in the chart, may correspond to a second outside air setpoint 11, labeled "level two" or "L2" in the chart. In certain embodiments, at every point in time, the second outside air setpoint 11 may be set at a few degrees higher than the first outside air setpoint 11. The difference between the first outside air setpoint 11 and the second outside air setpoint 11 may be predetermined. As discussed above, the two outside air setpoints 11 may be factors in the determination for the activation of certain economizers. For example, when the inside temperature reading 10 of the facility 3 rises above a first inside air setpoint 14, an outside air temperature reading 12 is compared to the first outside air setpoint 11 ("L1" in the chart). If the outside air temperature reading 12 is below the first outside air setpoint 11, then a lead group 7 of economizers 2 may be activated to handle the temperature load 8 of the facility 3. If the outside temperature reading 12 rises to between the first outside air setpoint L1 11 and a second outside air setpoint L2 11, a lag group 9 of economizers 2 may also be activated. Utilization of both groups of economizes 2 may satisfy the additional cooling requirements of a facility 3 while the outside air temperature 12 of the facility 3 remains within the temperature window 18 set between the two outside air setpoints 11, L1 and L2. If the outside air temperature 12 of the facility 3 rises above the second outside air setpoint 11 ("L2" in the chart), both groups of economizes 2 may be deactivated and the air conditioning compressor(s) 17 may be activated in order to condition the inside air that is recirculated within the facility 3. As further illustrated by FIG. 2, the temperature window 18 may dynamically adjust upward or downward as the optimum outside air setpoints 11 are identified to maintain the targeted temperature 13 (not shown) for the facility 3. The outside air setpoints 11 may be adjusted based on whether the preceding temperature windows(s) 18 facilitated the maintenance of the targeted temperature 13 for the facility 3 by the activated economizers 2.

For some embodiments, an advantage of the presently disclosed invention may include a reduction in the energy consumption 16 by running multiple economizers 2 at a high outside air temperature 12 that is within the temperature window 18 versus running a mechanical air conditioning compressor 17 at such a temperature range. Another advantage may include a reduction in the energy consumption 16 by activating the HVAC blowers/fans for only the lead group 7 of economizers 2 at an outside air temperature 12 that is below the temperature window 18 versus running blowers/fans for all economizers 2, including the lag group 9 of economizers 2. A benefit may include the capability to automatically adjust for changes in the heat load 8 of a facility 3 and changes in performance between HVAC equipment 1 by monitoring the performance of the HVAC equipment 1. Another advantage may be ability to adapt to variations in sensor readings due to placement or orientation. In certain embodiments, a further benefit may include an adaptive algorithm for determining when to use economizers 2 based on equipment available at a facility 3. For example, a facility may have a single HVAC unit 1 with an economizer 2, multiple HVAC units 1 with economizers 2, economizers 2 configured as separate standalone equipment (such as supply fans, exhaust fans and dampers), or any combination thereof. An additional benefit for embodiments of the presently disclosed invention may include the low cost of implementation and may include the limited nature of modifications that may need to be made to existing HVAC equipment 1 and/or power generating equipment 5. While economizer control schemes based on electrical or current load information may include the installation of electricity sensors, embodiments of the presently disclosed invention, inter alia, address the problem of dynamically maintaining the targeted temperature 13 within a facility 3 by controlling economizers 2 without electrical or current load information for information/communications equipment 4 located in the facility 3.

Figure 3:
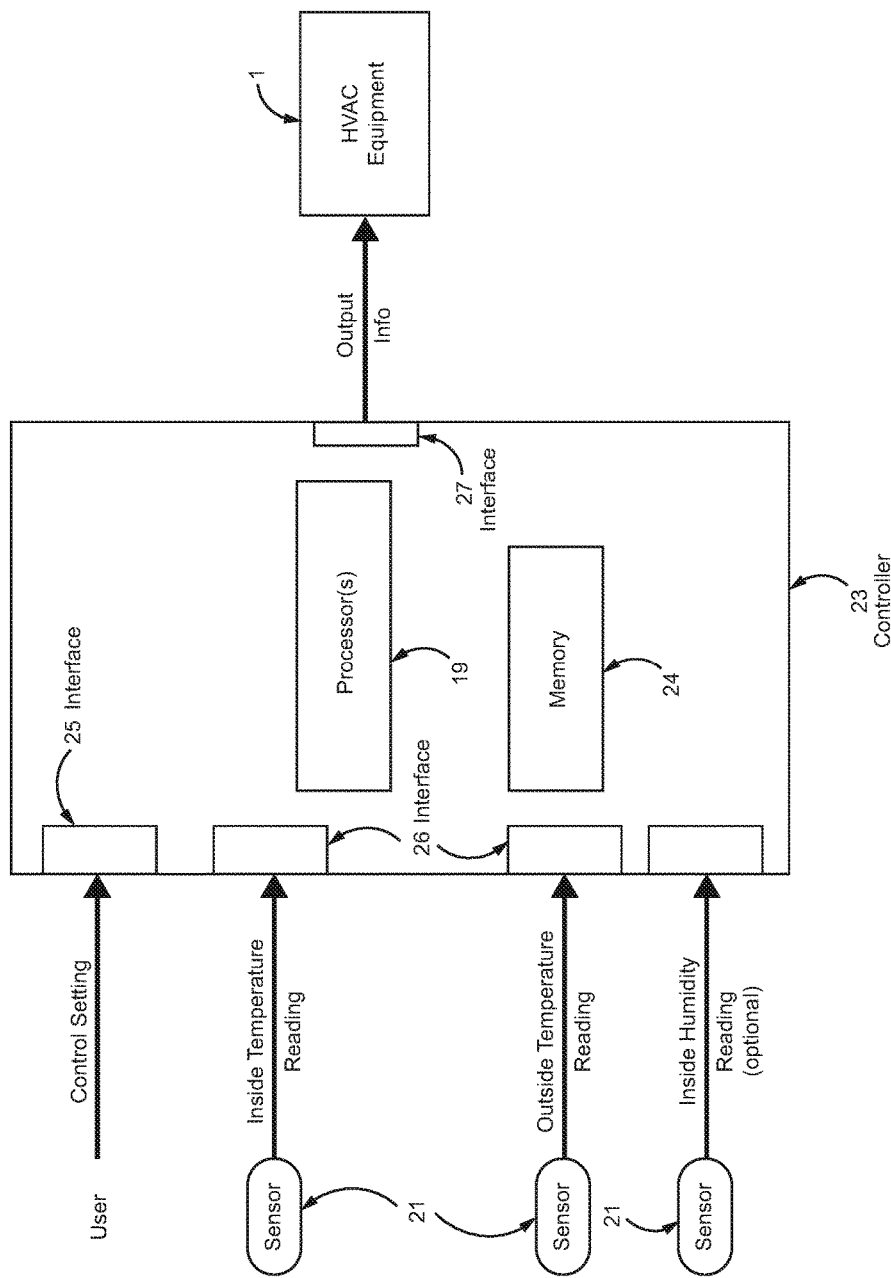
FIG. 3 is a diagram illustrating components of an embodiment of an economizer controller, in accordance with certain embodiments of the invention.

As shown in FIG. 3, in certain embodiments, the presently disclosed invention may utilize a processing unit or microprocessor(s) 19 to enable the evaluation of input information 20 received from various sensors 21 and control settings 22 in order to operate the economizers 2. Sensors 21 may comprise thermometers, thermostats, thermistors and/or thermocouples. Such sensors 21 may be located inside or outside of the facility 3, and in various places within the air vent. The sensors 21 may measure various temperatures for air within the facility, outside air, return air, and mixed air (e.g. air at certain locations within the vent that include a mixture of outside air and return air depending on which dampers are open or closed). In certain embodiments that optionally monitor humidity, some of the sensors 21 may include inside humidity sensors. The input information 20 received from the sensors 21 may be collected in real-time, upon certain occurrences or events, upon request, and/or at certain time intervals. In certain embodiments, the processor(s) 19 may apply control logic to dynamically determine the outside air setpoints 11 based on the input information 20, which may include inside air temperature 10 received from temperature sensors 21 located inside the facility 3, outside air temperature 12 received from temperature sensors 21 located outside the facility 3, and control settings 22. Control settings 22 may be received over a network, from a memory device and/or from an user, such as building engineer or HVAC technician. The control settings 22 may include predetermined settings, such as specifications for the specific HVAC equipment 1 at the facility 3. The predetermined settings may include the value representing the difference between a first outside air setpoint 11 and a second outside air setpoint 11, which corresponds to the first setpoint 11, to define a temperature window 18 of predetermined range.

In some embodiments, an economizer controller 23 may comprise the microprocessor(s) 19, memory 24, an user interface 25, sensor interface(s) 26, and/or an output interface 27. An economizer controller 23 may also comprise a server, a computer and/or data communication bus for the transmission of information between the components of the economizer controller 23. The particular architecture or manner of interconnecting the components may vary, and any task may be performed by one or more other components. The memory 24 may store the input information 20, historic information 28, and output information 29. The memory 24 may include ROM (Read Only Memory), volatile RAM (Random Access Memory), non-volatile memory such as hard drive and flash memory and any other type of storage device for storing information and instructions for execution by processors 19. The user interface 25 may include any device that receives input from an user, such as a keyboard, mouse, keypad, touchpad, touchscreen, stylus and microphone. The output interface 27 may transmit the output information 29 to HVAC equipment 1, thereby controlling the economizers 2. In certain embodiments, the output interface 27 may include any device that provides input to an user, such as a monitor, display, printer, speaker, data exporter, email exchange server, and the like. An economizer controller 23 may utilize hardware circuitry to implement the presently disclosed invention. The microprocessor(s) 19 may execute instructions stored in a computer-readable medium, such as a non-transitory memory device, that may cause the microprocessor(s) 19 to perform tasks and processes pursuant to the instructions to implement the presently disclosed invention. In various embodiments, hardwired circuitry may be used in combination with software instructions to implement such techniques.

In certain embodiments, the historic information 28 may include inside air temperature 10, outside air temperature 12, control settings 22, and/or output information 29. Such information may be collected upon certain occurrences or events, upon request, and/or at certain time intervals. Such triggering events may include the activation or deactivation of economizers due to the rising or lowering of inside air temperature 10 above or below inside air setpoints 14, and/or the rising or lowering of outside air temperature 12 above or below outside air setpoints 11. The control logic may apply certain historic information 28 in the determination of the subsequent outside air setpoints 11. In some embodiments, the historic information 28 may include prior outside air setpoints 11 and/or prior temperature windows 18. In certain embodiments, the historic information 28 may include prior performance information 30 for the HVAC equipment 1 corresponding to prior outside air setpoints 11 and/or prior temperature windows 18.

Figure 4:
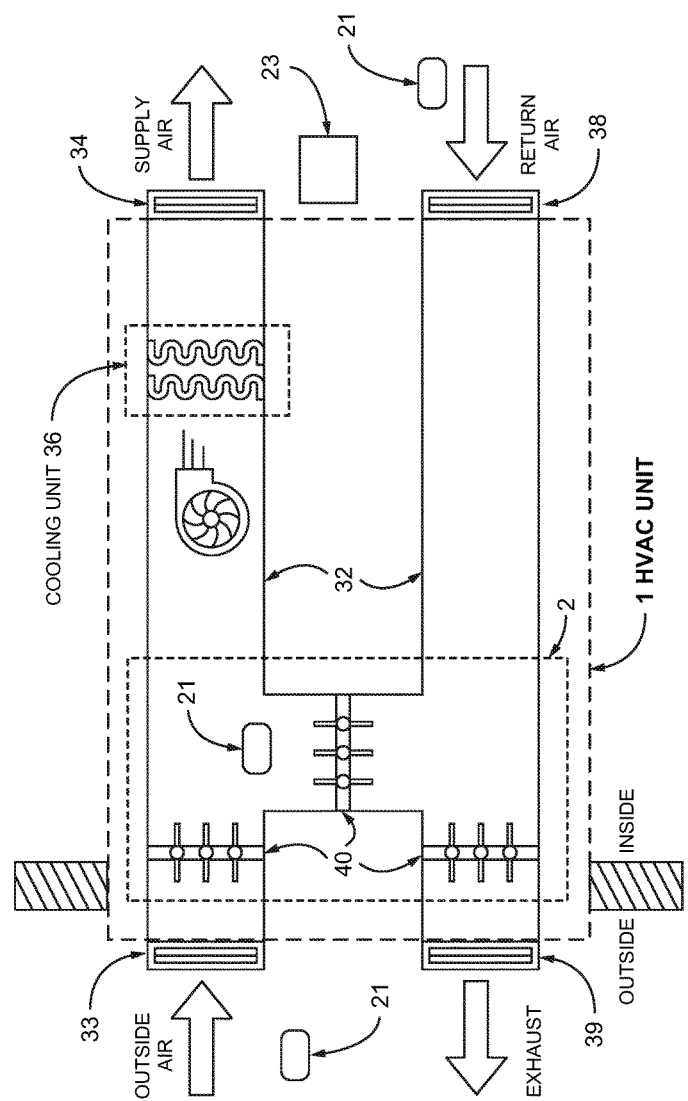
FIG. 4 is a schematic diagram of an embodiment of HVAC equipment equipped with an economizer, in accordance with certain embodiments of the invention.

FIG. 4 is a schematic diagram of HVAC equipment 1 equipped with an airside economizer 2, in accordance with certain embodiments of the invention. Outside air 6 may enter an air vent 32 via an exterior intake 33. If the economizer 2 is activated, outside air 6 may traverse within the air vent 32 and exit through a supply register 34 that opens into a facility 3. Depending on whether the supply air 35 needs conditioning, in an embodiment, a cooling unit 36 comprising air conditioning compressor(s) 17 may be activated. Return or inside air 37 located within the facility 3 may enter the air vent 32 via a return air register 38. If the economizer 2 is activated, the return air 37 may exit via an exhaust grill 39. Otherwise, the return air 37 may be recycled by traversing within the air vent 32 and through the cooling unit 36 and the supply register 34 and then back into the facility 3. The economizer 2 may be activated and deactivated by engaging certain dampers 40. The dampers 40 may be opened or closed by varying amounts in order to control the amount of air flow passing through the dampers 40. As shown, the economizer 2 may include temperature sensors 21 for measuring the temperature of return air 37 entering via a return air register 38 and outside air 6 entering via an exterior intake 33. Temperature sensors 21 may be positioned in various locations inside and/or outside of the HVAC equipment 1. For example, temperature sensors 21 may be standalone devices located within and/or outside of a facility 3. Other components of the HVAC equipment 1 may be located either within or outside of a facility 3, including a cooling unit 36, an economizer 2, and an economizer controller 23.

Figure 5:
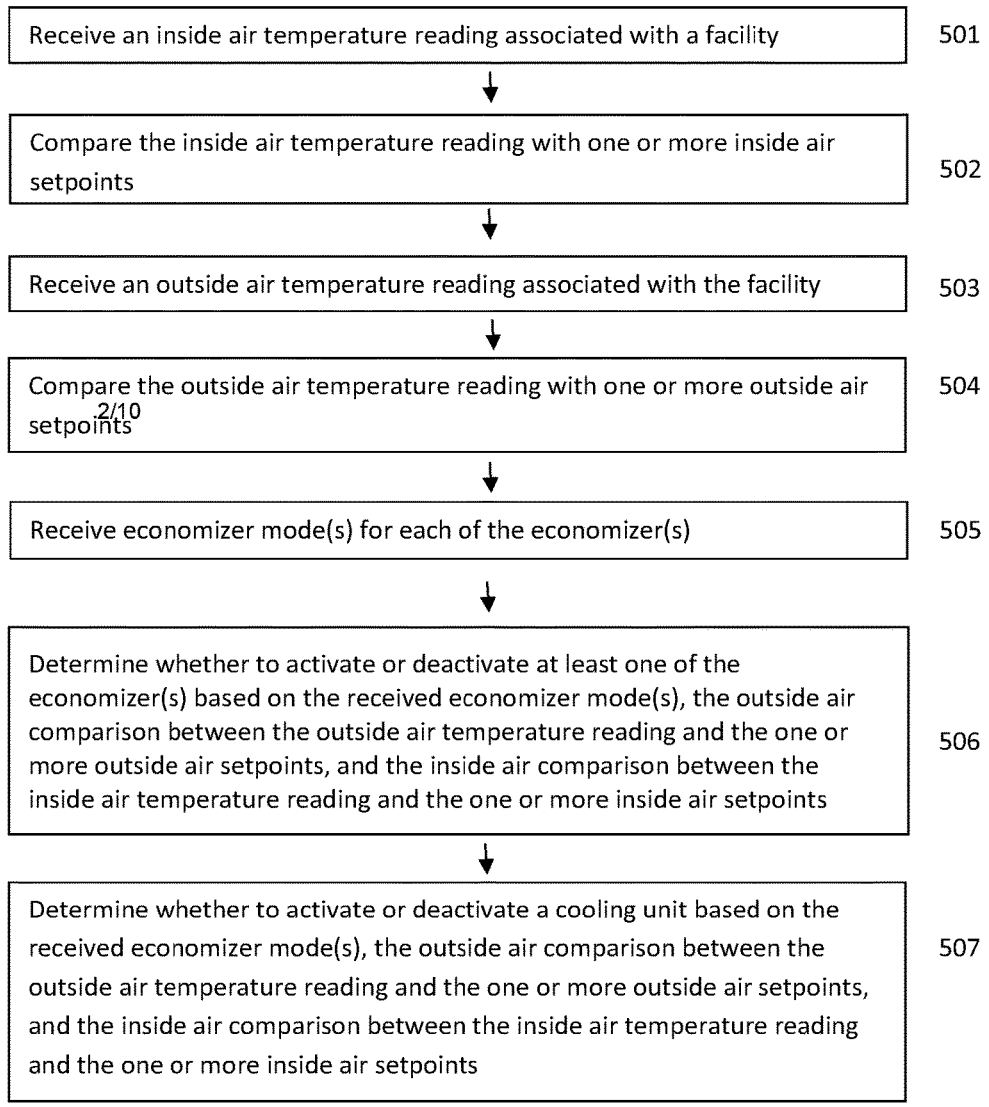
FIG. 5 is a flowchart illustrating steps of an embodiment for determining when and how many economizers to use for cooling a facility, in accordance with certain embodiments of the invention.

FIG. 5 is a flowchart diagram showing a block of steps in a process or method for determining when and how many economizer(s) 2 to use for cooling a facility 3, in accordance with certain embodiments of the invention. The method may be implemented with any HVAC equipment 1 equipped with one or more airside economizer(s) 2, including the embodiment depicted in FIG. 4. In an embodiment, one or more steps of the method may be performed by various components of the economizer controller 23 and/or by other devices adapted to communicate with the economizer controller 23. At block 501, the method may include the step of receiving a current inside air temperature reading 10 for the facility 3. At block 502, the method may include the step of comparing the inside air temperature 10 with one or more inside air setpoints 14. The method may also include the step of receiving outside air temperature 12 at block 503. At block 504, the method may include the step of comparing the outside air temperature 12 with one or more outside air setpoints 11. In some embodiments, the setpoints 11 may comprise a first and second outside air setpoint 11. In certain embodiments, this comparison step (block 504) may comprise determining whether the outside air temperature 12 is less than the first outside air setpoint 11, and may further comprise determining whether the outside air temperature 12 is between the first outside air setpoint 11 and the second outside air setpoint 11, and may still further comprise determining whether the outside air temperature 12 is greater than the second outside air setpoint 11. Further, at block 505, the method may comprise the step of receiving current mode(s) 41 for each of the economizer(s) 2. The economizer mode 41 may include the activation status of: all economizer(s) 2, a lead group 7 of economizer(s) 2, a lag group 9 of economizer(s) 2, or none of the economizer(s) 2. At block 506, the method may include the step of determining which of the economizer(s) 2 at the facility 3 to activate/deactivate (modify the economizer mode of an economizer) based on the received economizer mode(s) 41, the outside air comparison between the outside air temperature 12 and the outside air setpoints 11, and the inside air comparison between the inside temperature reading 10 and the inside air setpoints 14. This determination (block 506) may comprise determining whether to modify the economizer mode(s) 41 for at least one of the economizer(s) 2. In some embodiments, this determination (block 506) may further comprise a determination of the amount that a damper 40 should be opened or closed. Such embodiments may comprise implementations that include only one economizer 2. In certain embodiments, at block 507, the method may include the step of determining whether to activate or deactivate a cooling unit 36 based on the economizer modes 41, the outside air comparison between the outside air temperature 12 and the outside air setpoints 11, and the inside air comparison between the inside air temperature reading 10 and the inside air setpoints 14.

Figure 6:
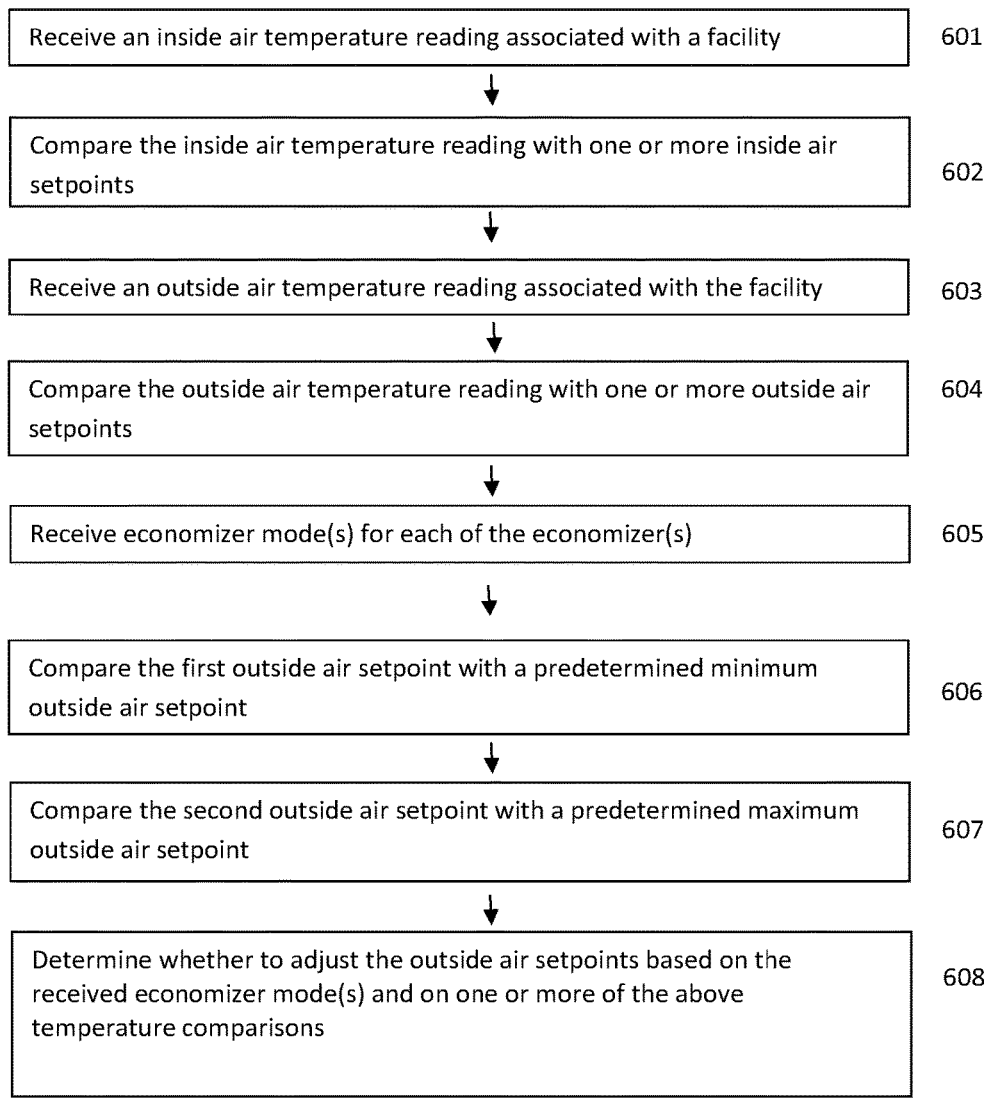
FIG. 6 is a flowchart illustrating steps of an embodiment for adjusting or floating outside air setpoints, in accordance with certain embodiments of the invention.

FIG. 6 is a flowchart diagram showing a block of steps in a process or method for adjusting or floating outside air setpoints 11, in accordance with certain embodiments of the invention. At block 601, the method may include the step of receiving a current inside air temperature reading 10 for the facility 3. At block 602, the method may include the step of comparing the inside air temperature 10 with one or more inside air setpoints 14. The method may also include the step of receiving outside air temperature 12 at block 603. At block 604, the method may include the step of comparing the outside air temperature 12 with one or more outside air setpoints 11. In some embodiments, the setpoints 11 may comprise a first and second outside air setpoint 11. Further, at block 605, the method may comprise the step of receiving current mode(s) 41 for each of the economizer(s) 2. At block 606, the method may include the step of comparing the first outside air setpoint 11 with a predetermined minimum outside air setpoint 42. At block 607, the method may include the step of comparing the second outside air setpoint 11 with a predetermined maximum outside air setpoint 43. In certain embodiments, at block 608, the method may include the step of determining whether to adjust the outside air setpoints 11 based on the received economizer mode(s) and any one of the temperature comparisons in blocks 602, 604, 606, and 607. In some embodiments, this adjustment determination (block 608) may comprise a determination of the amount (in temperature degrees) that the outside air setpoints 11 should be adjusted either upward or downward.

In an embodiment, the adjustment determination (block 608) may be based on a temperature comparison. The temperature comparison may be selected from a group consisting of: the comparison of the outside air temperature 12 with the outside air setpoints 11 (block 604); the comparison of the inside air temperature 10 with the inside air setpoints 14 (block 602); the comparison of the first outside air setpoint 11 with the predetermined minimum outside air setpoint 42 (block 606); the comparison of the second outside air setpoint 11 with the predetermined maximum outside air setpoint 43 (block 607).

As described above, in accordance with certain embodiments for the presently disclosed invention, a benefit of implementing an economizer controller 23 includes the determination of how many economizers 2 to turn "on" based upon the outside air temperature 12. The controller 23 may accomplish this by establishing control windows 18 for various OSA temperature ranges. The controller 23 may determine if an economizer mode 41 can be used based upon outside air temperature 12, inside humidity 44, ability to maintain the targeted temperature 13, and/or alarm conditions 45. Alarm conditions 45 may include smoke/fire detection, HVAC failure, high temperature in the facility, high humidity in the facility, or generator running. In an embodiment, such conditions 45 must be met in order to allow the use of economizers 2.

Figure 7:
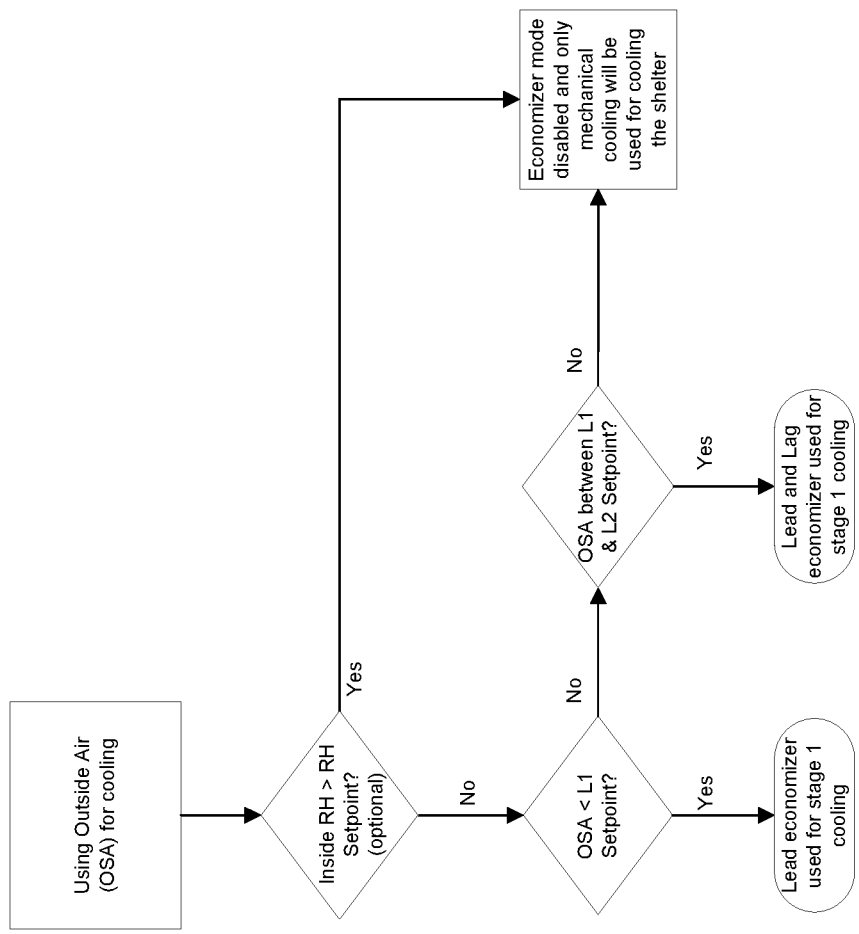
FIG. 7 is another flowchart illustrating steps of an embodiment for determining when to use economizers for cooling a facility, in accordance with certain embodiments of the invention.

As shown in FIG. 7, an implementation of an embodiment may utilize two outside air (OSA) setpoints 11 for controlling an economizer 2. The first setpoint (L1) 11 is used to determine the bottom of the control window 18 for using OSA 6. When the OSA 6 is below this setpoint 11, the economizer controller 23 may determine the economizer mode 41 and stage the economizers 2 "on" based upon the inside temperature 10. If the inside temperature 10 for a facility 3 continues to rise with the lead stage 7 then additional stages of economizing can be turned "on" in order to satisfy the targeted temperature 13. The second setpoint (L2) 11 may be used to set the top of the OSA window 18. When the OSA temperature 12 is between setpoint L1 11 and setpoint L2 11, the economizer controller 23 may determine that all stages of economizing must be turned "on" at the same time to maintain the targeted temperature 13 in the facility 3. If the OSA temperature 12 is greater than setpoint L2 11, then the economizer controller 23 may disable the economizers 2 and may rely on mechanical cooling via the cooling unit 36.

In an embodiment, the L1 and L2 setpoints 11 create a window 18 where the controller 23 determines which and how many economizers 2 are required to run. The controller 23 may adjust the window 18 upward and downward to select the optimum outside air temperature required to maintain the targeted temperature 13 for the facility 3. Setpoints L1 and L2 11 may be user programmable. In certain embodiments, a minimum of 3 degrees between the two setpoints 11 may be required to create an optimal window 18. The setpoints L1 and L2 11 for window 18 always adjust together maintaining the same delta between the two setpoints 11, in accordance with certain embodiments. The maximum amount that the window 18 is allowed to be adjusted may be user selectable. In some embodiments, a 5-10 degree maximum adjustment (upward or downward) from the starting point may be selected.

In an embodiment, the controller 23 constantly monitors the OSA temperature 12 and determines if it is below setpoint L1 11, between setpoints L1 and L2 11, or above setpoint L2 11. Once the OSA temperature 12 crosses into one of these temperature ranges, it must remain in that range for a user definable delay time, in accordance with certain embodiments. This is to prevent sudden changes in the OSA temperature 12 from causing the controller 23 to overreact. For example, if the OSA temperature 12 is between setpoints L1 and L2 11 for 15 minutes, then it is acceptable to enable stage 2 of economizer mode 41, i.e. turn "on" the lag group 9 of economizers 2.

While the above implementations for disclosed embodiments primarily discuss grouping multiple economizers 2 into two stages, the same principles and techniques could be extended to support additional groups of economizers 2 by adding more outside air setpoints 11 (e.g. L3 and LA setpoints, and L5 and L6 setpoints, etc.) to create additional windows 18 in which additional economizers 2 could be used.

In some embodiments, monitoring the interior humidity 44 of the facility 3 is ideal in order to disable the economizer mode 41 if the humidity 44 exceeds a predetermined humidity threshold 45. In certain implementations based on a dry bulb temperature (DBT) 46, the monitoring of humidity 44 is an optional function. Accordingly, some applications may not be concerned with internal humidity monitors. In some embodiments for determining the use of economizer(s) 2 based upon enthalpy 15, a sensor to measure inside air temperature 10 and humidity 44 is required in order to calculate an enthalpy value. In such embodiments, the presently disclosed techniques of adjusting the outside air setpoints 11 based on the inside air temperature 10 of the facility 3 may remain the same. The economizer mode 41 may be disabled if the humidity 44 in the facility 3 is greater than a maximum allowable humidity threshold 45, such as a relative humidity (RH) setpoint 47. In an embodiment, this setpoint 47 may initially be set at 65% RH. It may be user settable. In certain embodiments, once the economizer mode 41 has been disabled, it must remain disabled until the humidity 44 is below the setpoint 47 minus a dead band (5%) for a minimum programmable time and the targeted temperature 13 in the facility 3 is satisfied, i.e. there is no call for cooling.

In accordance with certain embodiments, the controller 23 may determine if it can maintain the targeted temperature 13 in a facility 3 when using economizer mode 41. This is based upon the outside air temperature 12 as well as the ability of the economizers 2 being used to maintain the targeted temperature 13. If the economizer mode 41 is enabled and outside air temperature 12 is below level one (L1) setpoint 11, then the lead group 7 of economizers 2 may be used when the inside air temperature 10 is greater than the inside air setpoint C1 14. If the inside air temperature 10 continues to rise above the inside air setpoint C2 14, then the economizers 2 in the lag group 9 may be used. If the inside air temperature 10 continues to rise above the inside air setpoint C3 14 after all groups of economizers 2 are activated, then the controller 23 may determine that economizer mode 41 is not able to maintain the targeted temperature 13 and automatically switch to using mechanical air conditioning mode to bring the inside air temperature 10 back in range. This may be part of a learning mode 48 (further discussed below) that the controller 23 employs to determine the optimum temperature range for the outside air 6 required to match the temperature load 8 for the facility 3. If the outside air temperature 12 is between L1 and L2 setpoints 11, then the controller 23 may determine that more than the lead group 7 of economizers 2 is required to maintain the targeted temperature 13 for the facility 3. Accordingly, the controller 23 may turn "on" both groups of economizers 2 at the same time when the inside air temperature 10 is above the inside air setpoint C1 11 versus waiting until the inside air temperature 10 rises higher than the inside air setpoint C2 11. If the inside air temperature 10 continues to rise after all groups of economizers 2 are activated, then the controller 23 may determine that economizer mode 41 is not able to maintain the targeted temperature 13 and automatically switch to using mechanical air conditioning mode to bring the inside air temperature 10 back in range. This may also be part of the learning mode 48 that the controller 23 employs to determine the optimum temperature range for the outside air 6 required to match the temperature load 8 for the facility 3.

As referenced above, in accordance with certain embodiments for the presently disclosed invention, a benefit of implementing an economizer controller 23 includes adapting to the changing conditions within the facility 3. Accordingly, the setpoints 11 for determining when to use economizer mode(s) 41 may be adjusted or floated upward and downward based upon the ability of the economizers 2 to maintain the targeted temperature 13 for a facility 3. The controller 23 may deploy a method of adjusting the L1 and L2 setpoints 11 upward and downward to allow the economizer mode 41 to adjust to present operating conditions. In an embodiment, L1 and L2 settings 11 may always adjust together to maintain the same window size that was set by the user. As discussed above, additional windows 18 may be implemented by adding more setpoints 11 (e.g. L3 and L4) to create additional windows 18.

Figure 8:
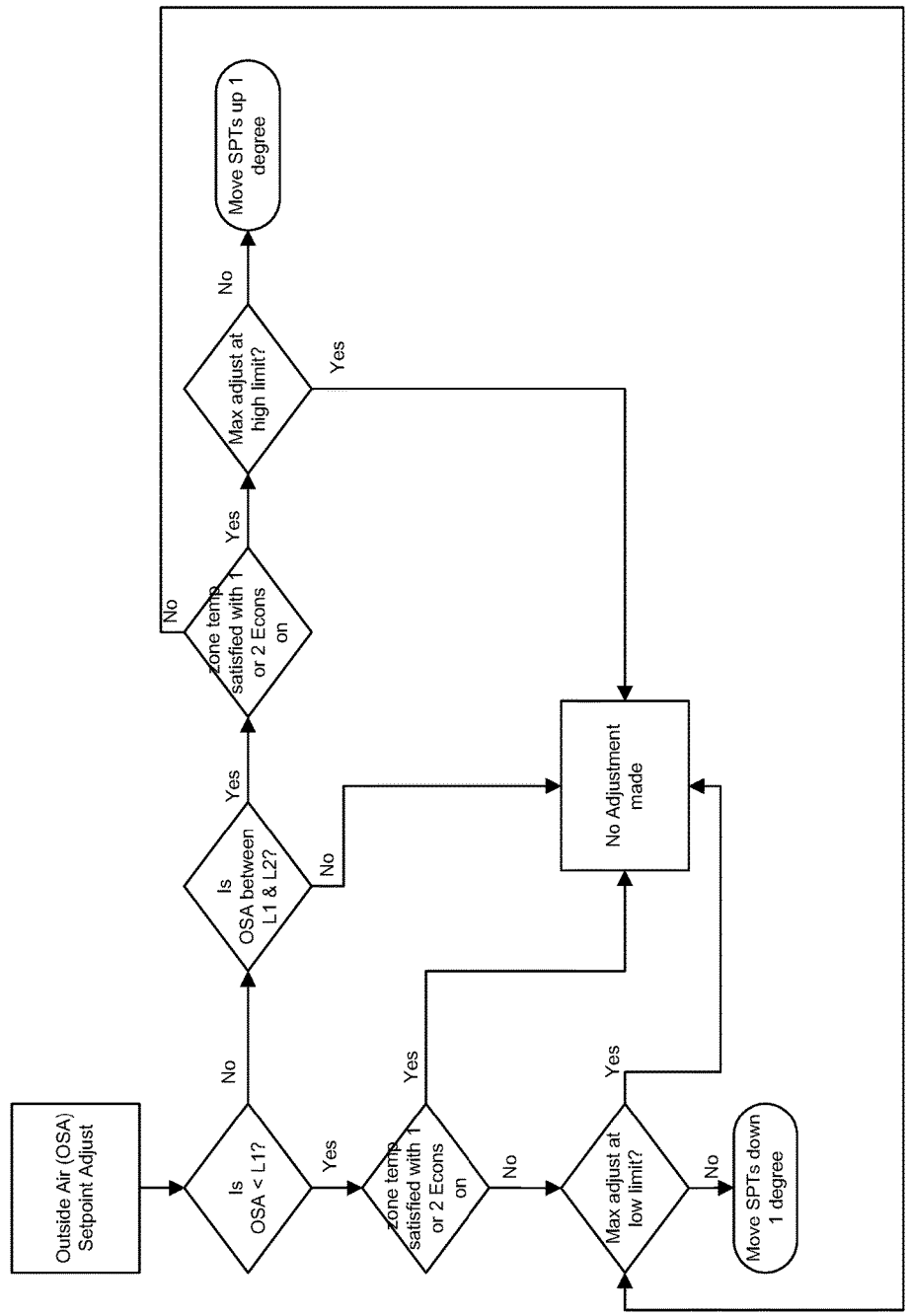
FIG. 8 is another flowchart illustrating steps of an embodiment for adjusting or floating outside air setpoints, in accordance with certain embodiments of the invention.

As shown in the embodiment depicted in FIG. 8, if the OSA temperature 12 is below setpoint L1 11 and the activated economizer 2 was able to satisfy the targeted temperature 13, then no adjustment is made to the setpoints 11. If both groups of economizers 2 are used and the targeted temperature 13 is determined not to be satisfied, thereby requiring a switch to mechanical cooling, then the outside air setpoints (L1 & L2) 11 may be adjusted downward by one temperature degree. This process may repeat every time that there is a call for cooling until the setpoints 11 reach the lowest available value for setpoint L1 11, i.e. the minimum outside air setpoint 42. The minimum setpoint 42 may be a user selectable setting. If the OSA temperature 12 is between setpoints L1 and L2 11 and the economizer mode 41 is able to satisfy the targeted temperature 13 for the facility 3, then the outside air setpoints 11 may be adjusted upward by one temperature degree. The setpoints 11 may be adjusted upward to the maximum allowable value for setpoint L2 11, i.e. the maximum outside air setpoint 43. The settings may be adjusted at the end of the cooling cycle once the targeted temperature 13 is determined to be satisfied. The maximum setpoint 43 may be a user selectable setting. If the OSA temperature 12 is between setpoints L1 and L2 11 and all economizers 2 are used and the targeted temperature 13 is determined not to be satisfied, thereby requiring a switch to mechanical cooling, then the outside air setpoints (L1 & L2) 11 may be adjusted downward by one temperature degree. This process may repeat every time there is a call for cooling until the outside air setpoints 11 reach the lowest available value for setpoint L1 11, i.e. the minimum outside air setpoint 42. The decision matrix shown in FIG. 9 illustrates such determinations that account for various fluctuations in inside air temperature readings 10 and outside air temperature readings 12.

In some embodiments, the memory 24 may store a data structure 31 generated by the economizer controller 23. The information that may be provided in data structure 31 may include values corresponding to the following data types: setpoints, timers, sensor reading inputs, statuses, and performance/operations outputs. The stored setpoints may include: L1 Initial, the initial value of L1, which may be user changeable; L2 Initial, the initial value of L2, which may be user changeable; L1 Current/Updated, the current calculated value of L1 that the controller has adjusted to; L2 Current/Updated, the current calculated value of L2 that the controller has adjusted to; L2 Max, the maximum value that L2 can move up to, which may be user changeable; and, L1 Min, the lowest value that L1 can move down to, which may be user changeable. The stored setpoints may further include: Inside Air Setpoint (C1), the setpoint that may be used to determine if cooling is required in the facility; and, Inside Air Delta 1, a user selectable delta value that may be added to an Inside Air Setpoint (e.g. C1) that may be used to determine whether to turn on a second group of economizers if the outside air is below L1, or if both groups of economizers are already on due to outside air being between L1 and L2, to determine whether to switch to mechanical cooling. The stored setpoints may also include: Humidity Disable, a user settable point where when humidity is greater than this value, which may be used to determine whether the economizer mode may be disabled; and, Humidity Enable, a user settable point where when the humidity is below this value, which may be used to determine whether the economizer mode may be enabled. Stored temperature reading may include: Inside Air Temperature Reading, the temperature sensor value inside the facility that may be used to make control decisions, which may be a single sensor value, average of multiple sensors readings or the highest value of multiple sensor readings; and, Humidity Reading, the current value of the humidity in the facility. Stored timers may include: Outside Air Dwell Time, the user programmable time delay when the outside air temperature moves below L1, between L1 and L2, or above L2 before changing economizer modes; Humidity Dwell Time, a user settable time delay where the humidity reading is above a Humidity Disable setpoint to disable humidity, which may be used as a delay for the Humidity Enable when the Humidity Reading is below an enable setpoint. Stored statuses may include: Alarm Bit Status, which may be used to disable economizer mode if an alarm condition exists, such as high temperature, smoke/fire alarm or failure of the HVAC system; and, Economizer Mode Status, which may include monitoring and trending point to log the status of the economizer mode, and may include values that comprise minimum damper position, logs tracking which economizers are operating, and logs tracking if the economizers are disabled due to an alarm condition. Further, stored output may include an Economizer Output, a percentage from 0-100% indicating the amount of outside air is being used for cooling.

Figure 10:
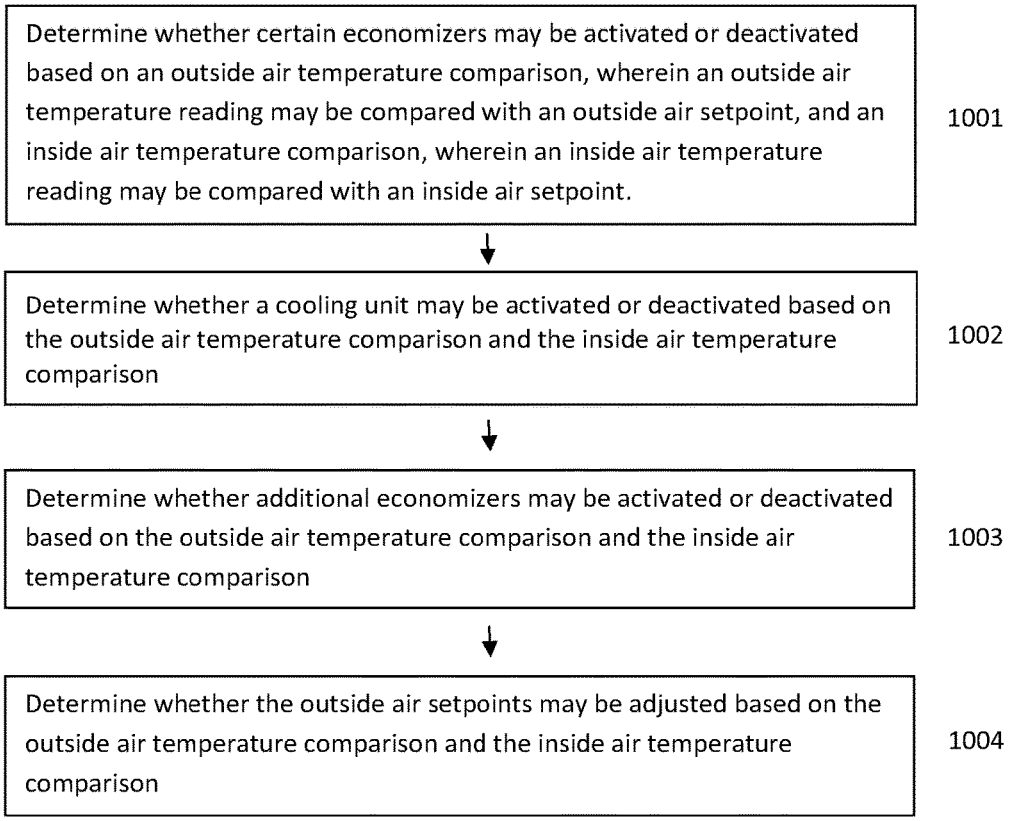
FIG. 10 is another flowchart illustrating steps of an embodiment for controlling HVAC equipment having economizers for cooling a facility, in accordance with certain embodiments of the invention.

As shown in FIG. 10, an embodiment for controlling HVAC equipment 1 having economizers 2 for cooling a facility 3 may comprise a determination by an economizer controller 23, at block 1001, of whether certain economizers 2 may be activated or deactivated based on an outside air temperature comparison and an inside air temperature comparison. In the former comparison, an outside air temperature reading 12 may be compared with an outside air setpoint 11. In the latter comparison, an inside air temperature reading 10 may be compared with an inside air setpoint 14. The implementation may also comprise a determination by the economizer controller 23, at block 1002, of whether a cooling unit 36 may be activated or deactivated based on the outside air temperature comparison and the inside air temperature comparison. In certain embodiments, the implementation may further comprise a determination by the economizer controller 23, at block 1003, of whether additional economizers 2 may be activated or deactivated based on the outside air temperature comparison and the inside air temperature comparison. In some embodiments, the implementation may comprise a determination by the economizer controller 23, at block 1004, of whether to adjust the outside air setpoints 11 based on the outside air temperature comparison and the inside air temperature comparison.

While the invention has been particularly shown and described with reference to an embodiment thereof, it will be understood by those skilled in the art that various changes in form and details may be made therein without departing from the spirit and scope of the invention. Although some of the drawings illustrate a number of operations in a particular order, operations which are not order-dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof. The term "adapted" when used in this application shall mean programmed, configured, dimensioned, oriented and arranged as appropriate to the purpose or function described.

What is claimed is:

1. A method for controlling HVAC equipment with an economizer controller to manage a temperature of a facility having a heat load, comprising the steps of:
   receiving, by the economizer controller, an inside air temperature reading associated with the facility, wherein the HVAC equipment is operably connected to one or more economizers adapted to supply outside air via one or more air vents to the facility when in an active mode, wherein the inside air temperature reading is measured by an inside temperature sensor located inside of the facility and outside of the one or more air vents;
   comparing, by the economizer controller, the inside air temperature reading with one or more inside air setpoints for the facility;
   receiving, by the economizer controller, an outside air temperature reading associated with the facility, wherein the outside air temperature reading is measured by an outside temperature sensor located outside of the facility and outside of the one or more air vents;
   comparing, by the economizer controller, the outside air temperature reading with one or more outside air setpoints for the facility;
   receiving, by the economizer controller, economizer modes for the one or more economizers;
   determining, by the economizer controller, whether to modify the economizer mode for at least one of the economizers based on the received economizer modes, the outside air temperature comparison between the outside air temperature reading and the one or more outside air setpoints, and the inside air temperature comparison between the inside air temperature reading and the one or more inside air setpoints; and,
   activating at least one of the economizers when:
      the outside air temperature reading is less than at least one of the outside air setpoints, and
      the inside air temperature reading is greater than at least one of the inside air setpoints.

2. A method for controlling HVAC equipment with an economizer controller to manage a temperature of a facility having a heat load, comprising the steps of:
   receiving, by the economizer controller, an inside air temperature reading associated with the facility, wherein the HVAC equipment is operably connected to one or more economizers adapted to supply outside air via one or more air vents to the facility when in an active mode, wherein the inside air temperature reading is measured by an inside temperature sensor located inside of the facility and outside of the one or more air vents;
   comparing, by the economizer controller, the inside air temperature reading with one or more inside air setpoints for the facility;
   receiving, by the economizer controller, an outside air temperature reading associated with the facility, wherein the outside air temperature reading is measured by an outside temperature sensor located outside of the facility and outside of the one or more air vents;
   comparing, by the economizer controller, the outside air temperature reading with one or more outside air setpoints for the facility;
   receiving, by the economizer controller, economizer modes for the one or more economizers;
   determining, by the economizer controller, whether to modify the economizer mode for at least one of the economizers based on the received economizer modes, the outside air temperature comparison between the outside air temperature reading and the one or more outside air setpoints, and the inside air temperature comparison between the inside air temperature reading and the one or more inside air setpoints; and,
   activating at least one of the economizers when:
      the outside air temperature reading is between two of the outside air setpoints, and
      the inside air temperature reading is greater than at least one of the inside air setpoints.

3. A method for controlling HVAC equipment with an economizer controller to manage a temperature of a facility having a heat load, comprising the steps of:
   receiving, by the economizer controller, an inside air temperature reading associated with the facility, wherein the HVAC equipment is operably connected to one or more economizers adapted to supply outside air via one or more air vents to the facility when in an active mode, wherein the inside air temperature reading is measured by an inside temperature sensor located inside of the facility and outside of the one or more air vents;
   comparing, by the economizer controller, the inside air temperature reading with one or more inside air setpoints for the facility;
   receiving, by the economizer controller, an outside air temperature reading associated with the facility;
   comparing, by the economizer controller, the outside air temperature reading with one or more outside air setpoints for the facility;
   receiving, by the economizer controller, economizer modes for the one or more economizers;
   comparing, by the economizer controller, a first outside air setpoint with a predetermined minimum outside air setpoint, wherein the one or more outside air setpoints comprise the first outside air setpoint and a second outside air setpoint, and wherein the second outside air setpoint is greater than a first outside air setpoint;
   comparing, by the economizer controller, the second outside air setpoint with a predetermined maximum outside air setpoint; and,
   determining, by the economizer controller, whether to adjust the outside air setpoints based on the received economizer modes and a temperature comparison.

4. The method of claim 3, wherein the temperature comparison is selected from a group consisting of:
   the outside air comparison between the outside air temperature reading and the one or more outside air setpoints, and the inside air comparison between the inside air temperature reading and the one or more inside air setpoints;
   the minimum outside air comparison of the first outside air setpoint with the predetermined minimum outside air setpoint; and,
   the maximum outside air comparison of the second outside air setpoint with the predetermined maximum outside air setpoint.

5. The method of claim 3, further comprising the step of: adjusting, by the economizer controller, the outside air setpoints based on a temperature comparison.

6. A method for controlling HVAC equipment, comprising the steps of:
   receiving, by an economizer controller, an inside air temperature reading associated with a facility, wherein the HVAC equipment is operably connected to one or more economizers adapted to supply outside air to the facility when in an active mode;

comparing, by the economizer controller, the inside air temperature reading with one or more inside air setpoints for the facility;

receiving, by the economizer controller, an outside air temperature reading associated with the facility;

comparing, by the economizer controller, the outside air temperature reading with one or more outside air setpoints for the facility;

receiving, by the economizer controller, economizer modes for the one or more economizers;

comparing, by the economizer controller, a first outside air setpoint with a predetermined minimum outside air setpoint, wherein the one or more outside air setpoints comprise the first outside air setpoint and a second outside air setpoint, and wherein the second outside air setpoint is greater than a first outside air setpoint;

comparing, by the economizer controller, the second outside air setpoint with a predetermined maximum outside air setpoint;

determining, by the economizer controller, whether to adjust the outside air setpoints based on the received economizer modes and a temperature comparison; and, adjusting the outside air setpoints upward when:
the outside air temperature reading is between the first outside air setpoint and the second outside air setpoint,
the inside air temperature reading is less than at least one of the inside air setpoints, and
the second outside air setpoint is less than the predetermined maximum outside air setpoint.

7. A method for controlling HVAC equipment, comprising the steps of:
receiving, by an economizer controller, an inside air temperature reading associated with a facility, wherein the HVAC equipment is operably connected to one or more economizers adapted to supply outside air to the facility when in an active mode;
comparing, by the economizer controller, the inside air temperature reading with one or more inside air setpoints for the facility;
receiving, by the economizer controller, an outside air temperature reading associated with the facility;
comparing, by the economizer controller, the outside air temperature reading with one or more outside air setpoints for the facility;
receiving, by the economizer controller, economizer modes for the one or more economizers;
comparing, by the economizer controller, a first outside air setpoint with a predetermined minimum outside air setpoint, wherein the one or more outside air setpoints comprise the first outside air setpoint and a second outside air setpoint, and wherein the second outside air setpoint is greater than a first outside air setpoint;
comparing, by the economizer controller, the second outside air setpoint with a predetermined maximum outside air setpoint;
determining, by the economizer controller, whether to adjust the outside air setpoints based on the received economizer modes and a temperature comparison; and,
adjusting the outside air setpoints downward when:
the outside air temperature reading is less than at least one of the outside air setpoints,
the inside air temperature reading is greater than at least one of the inside air setpoints, and the first outside air setpoint is greater than the predetermined minimum outside air setpoint.

8. The method according to claim 5, 6 or 7, further comprising the step of:
storing, in a memory, the adjusted outside air setpoints.

9. The method of claim 5, further comprising the steps of:
receiving, by the economizer controller, an updated inside air temperature reading associated with the facility;
comparing, by the economizer controller, the updated inside air temperature reading with at least one of the inside air setpoints;
receiving, by the economizer controller, an updated outside air temperature reading associated with the facility;
comparing, by the economizer controller, the updated outside air temperature reading with the adjusted outside air setpoints;
receiving, by the economizer controller, updated economizer modes for the one or more economizers;
determining, by the economizer controller, whether to modify the economizer mode for at least one of the economizers based on the updated economizer modes, the outside air comparison between the updated outside air temperature reading and the adjusted outside air setpoints, and the inside air comparison between the updated inside air temperature reading and the at least one of the inside air setpoints;
comparing, by the economizer controller, the adjusted first outside air setpoint with the predetermined minimum outside air setpoint;
comparing, by the economizer controller, the adjusted second outside air setpoint with the predetermined maximum outside air setpoint; and,
determining, by the economizer controller, whether to adjust the adjusted outside air setpoints based on the updated economizer modes and a second temperature comparison.

10. A device for controlling HVAC equipment with an economizer controller to manage a temperature of a facility having a heat load, comprising:
a memory to store instructions; and,
one or more processors adapted to execute instructions stored in the memory to:
receive, by the economizer controller, an inside air temperature reading associated with the facility, the HVAC equipment being operably connected to one or more economizers adapted to supply outside air via one or more air vents to the facility when in an active mode, wherein the inside air temperature reading is measured by an inside temperature sensor located inside of the facility and outside of the one or more air vents;
compare, by the economizer controller, the inside air temperature reading with one or more inside air setpoints for the facility;
receive, by the economizer controller, an outside air temperature reading associated with the facility, wherein the outside air temperature reading is measured by an outside temperature sensor located outside of the facility and outside of the one or more air vents;
compare, by the economizer controller, the outside air temperature reading with one or more outside air setpoints for the facility;
receive, by the economizer controller, economizer modes for the one or more economizers;

determine, by the economizer controller, whether to modify the economizer mode for at least one of the economizers based on the received economizer modes, the outside air temperature comparison between the outside air temperature reading and the one or more outside air setpoints, and the inside air temperature comparison between the inside air temperature reading and the one or more inside air setpoints;

compare, by the economizer controller, a first outside air setpoint with a predetermined minimum outside air setpoint, the one or more outside air setpoints comprising the first outside air setpoint and a second outside air setpoint, and the second outside air setpoint being greater than a first outside air setpoint;

compare, by the economizer controller, the second outside air setpoint with a predetermined maximum outside air setpoint; and, determine, by the economizer controller, whether to adjust the outside air setpoints based on a temperature comparison.

11. A non-transitory computer-readable medium including instructions to be executed by a processor, wherein the executed instructions are adapted to cause the processor to:

receive, by an economizer controller, an inside air temperature reading associated with a facility, wherein the HVAC equipment is operably connected to one or more economizers adapted to supply outside air via one or more air vents to the facility when in an active mode, wherein the inside air temperature reading is measured by an inside temperature sensor located inside of the facility and outside of the one or more air vents;

compare, by the economizer controller, the inside air temperature reading with one or more inside air setpoints for the facility;

receive, by the economizer controller, an outside air temperature reading associated with the facility, wherein the outside air temperature reading is measured by an outside temperature sensor located outside of the facility and outside of the one or more air vents;

compare, by the economizer controller, the outside air temperature reading with one or more outside air setpoints for the facility;

receive, by the economizer controller, economizer modes for the one or more economizers;

determine, by the economizer controller, whether to modify the economizer mode for at least one of the economizers based on the received economizer modes, the outside air temperature comparison between the outside air temperature reading and the one or more outside air setpoints, and the inside air temperature comparison between the inside air temperature reading and the one or more inside air setpoints;

compare, by the economizer controller, a first outside air setpoint with a predetermined minimum outside air setpoint, wherein the one or more outside air setpoints comprise the first outside air setpoint and a second outside air setpoint, and wherein the second outside air setpoint is greater than a first outside air setpoint;

compare, by the economizer controller, the second outside air setpoint with a predetermined maximum outside air setpoint; and, determine, by the economizer controller, whether to adjust the outside air setpoints based on a temperature comparison.

12. A method for controlling HVAC equipment with an economizer controller to manage a temperature of a facility having a heat load, comprising the steps of:

determining, by the economizer controller, whether a plurality of economizers may be activated or deactivated based on:
  a comparison of an outside air temperature reading with an outside air setpoint for the facility, wherein the HVAC equipment is operably connected to the plurality of economizers, wherein the economizers are adapted to supply outside air via one or more air vents to the facility when activated, and
  a comparison of an inside air temperature reading with an inside air setpoint for the facility, wherein the inside air temperature reading is measured by an inside temperature sensor located inside of the facility and outside of the one or more air vents;

determining, by the economizer controller, whether a cooling unit may be activated or deactivated based on:
  the comparison of the outside air temperature reading with the outside air setpoint, and
  the comparison of the inside air temperature reading with the inside air setpoint; and, determining, by the economizer controller, whether the outside air setpoints may be adjusted based on:
  the comparison of the outside air temperature reading with the outside air setpoint, and
  the comparison of the inside air temperature reading with the inside air setpoint.

* * * * *